(12) United States Patent
Thomas

(10) Patent No.: US 7,820,743 B2
(45) Date of Patent: Oct. 26, 2010

(54) PROCESS FOR PREPARING BITUMEN/ASPHALT BALE

(75) Inventor: Gordon William Thomas, Kuala Lampur (MY)

(73) Assignee: Eastern Petroleum SDN BHD, Kuala Lumpur (MY)

(*) Notice: Subject to any disclaimer, the term of this patent is extended or adjusted under 35 U.S.C. 154(b) by 1067 days.

(21) Appl. No.: 11/383,626

(22) Filed: May 16, 2006

(65) Prior Publication Data

US 2008/0242770 A1     Oct. 2, 2008

(30) Foreign Application Priority Data

Jul. 21, 2005   (MY) ................ PI 2005 3346

(51) Int. Cl.
*C08L 95/00*  (2006.01)
*B29C 47/88*  (2006.01)

(52) U.S. Cl. ............ 524/59; 264/211.12; 106/273.1

(58) Field of Classification Search .......... 106/14.34, 106/273.1, 276; 524/59; 264/211.12; 425/5, 425/130–133.5, 375, 804; 156/500
See application file for complete search history.

(56) References Cited

U.S. PATENT DOCUMENTS

| | | | |
|---|---|---|---|
| 4,333,866 A | 6/1982 | Uffner |
| 5,190,998 A | 3/1993 | Fisher |
| 5,395,439 A | 3/1995 | Basin et al. |
| 5,756,565 A | 5/1998 | Germanaud et al. |
| 6,087,420 A | 7/2000 | Planche et al. |
| 6,414,056 B1 | 7/2002 | Puzic et al. |
| 6,569,351 B1 | 5/2003 | Baumgardner et al. |
| 2003/0002920 A1 | 1/2003 | Hildebrand et al. |
| 2003/0231928 A1 | 12/2003 | Hildebrand et al. |

FOREIGN PATENT DOCUMENTS

| | | |
|---|---|---|
| EP | 0 582 219 | 2/1994 |
| EP | 0 618 274 | 10/1994 |
| EP | 1 065 249 | 1/2001 |
| EP | 1 350 813 | 10/2003 |
| FR | 2 517 686 | 6/1983 |
| FR | 2 813 619 | 3/2002 |
| WO | WO 93/18092 | 9/1993 |
| WO | WO 97/14754 | 4/1997 |
| WO | WO 97/16491 | 5/1997 |
| WO | WO 00/77098 | 12/2000 |
| WO | WO 02/46311 | 6/2002 |
| WO | WO 2004048204 A1 * | 6/2004 |
| WO | WO 2004/096917 | 11/2004 |

* cited by examiner

*Primary Examiner*—Jennifer K Michener
*Assistant Examiner*—Carlos Barcena
(74) *Attorney, Agent, or Firm*—Leong C. Lei

(57) ABSTRACT

A process for preparing bitumen bale for clean, safe, eco-friendly and cost-effective packing, storing and transporting of viscous bitumen products and the products thereof is delineated in the present disclosure. The bituminous products are introduced into a baling process line. The cooling efficiency is enhanced by utilizing the process. Viscous bitumen products are made in the form of spiral bitumen bale. "BituBale Film capsules" are produced by the process. Polymer additives are added to bitumen/asphalt, by the process, to enhance the durability and to get good gripping surfaces. The process enhances the homogenous nature of the products. The process for preparing bitumen bale for clean, safe, eco-friendly and cost-effective packing, storing and transporting of viscous bitumen products is a clean, safe, environmentally friendly and cost effective method.

3 Claims, 6 Drawing Sheets

PROCESS FOR PREPARING BITUMEN/ASPHALT BALE

This non-provisional application claims priority under 35 U.S.C. §119(a) on Patent Application No. PI20053346 filed in Malaysia on Jul. 21, 2005, the entire contents of which are hereby incorporated by reference.

FIELD OF INVENTION

The present invention relates to a process for preparing viscous hydrocarbon products' bale and products thereof and more particularly, to a process for preparing bitumen/asphalt bale for clean, safe, eco-friendly, energy saving cost-effective packing, storing and transporting of viscous bitumen/asphalt and the products thereof.

BACKGROUND OF THE INVENTION

Description of the Related Art

The bitumen/asphalt bale is a new concept for packing, storing and transporting viscous hydrocarbon products such as bitumen and/or Polymer Modified Bitumen/Asphalt (PMA/PMB), rubberized bitumen/asphalt, in cold form (herein referred to as Bituminous Product). This is a clean, safe, environmentally friendly and cost effective method.

Known prior art for process for preparing viscous hydrocarbon products and products thereof includes U.S. Pat. Application No. 20030231928 dated Mar. 20, 2003 of Hildebrand et al.; U.S. Pat. Application No. 20030002920 dated May 16, 2000 of Hildebrand et al.; EP Pat. No. 582,219 dated Oct. 29, 1997 to Kuechler et al.; U.S. Pat. No. 5,756,565 dated May 26, 1998 to Germanaud et al.; EP Pat. No. 1,065,249 dated Nov. 28, 2001 to Grisard AG; U.S. Pat. No. 6,087,420 dated Jul. 11, 2000 to Planche et al.; WO Pat. Application No. 1997014754 dated Oct. 16, 1996 of Elf Antar France; U.S. Pat. No. 5,395,439 dated Mar. 7, 1995 to Basin et al.; U.S. Pat. No. 5,190,998 dated Mar. 2, 1993 to Fisher; EP Pat. No. 1,352,031 dated Oct. 15, 2003 to BP Oil International Limited et al.; WO Pat. Application No. 1993018092 dated Mar. 1, 1993; FR Pat. No. 2,517,686 dated 1983 Jun. 10 to Benke et al.; WO Application No. 2004096917 of Marchal published on 2004 Nov. 11; FR Pat. No. 2,813,619 dated 2002 Mar. 8 to Faure et al.; EP Pat. No. 1,350,813 dated Oct. 8, 2003 to Rohm and Haas Company; WO Application No. 2000077098 dated Jun. 6, 2000 of Northern Elastomeric, Inc.; U.S. Pat. No. 6,569,351 dated May 27, 2003 to Baumgardner et al.; EP Pat. No. 618,274 dated Jul. 9, 1997 to Exxon Research and Engineering Company; U.S. Pat. No. 4,333,866 dated Jun. 8, 1982 to Uffner; U.S. Pat. No. 6,414,056 dated Jul. 2, 2002 to Puzic et al.; and WO Application No. 1997016491 dated Sep. 20, 1996 of Exxon Research and Engineering Company. A vast patent and non-patent literatures exist on the process for preparing viscous hydrocarbon products and products thereof. Some of the relevant as well as related documents are elaborated hereinafter.

U.S. Pat. Application No. 20030231928 discloses bitumen or asphalt for producing a road topping, whereby the bitumen or asphalt contains a proportion of paraffin obtained by Fischer-Tropsch synthesis (FT paraffin). A road topping with the bitumen and a method for producing a corresponding road topping or roadway covering using the bitumen have been discussed in this document.

U.S. Pat. Application No. 20030002920 relates to bitumen or asphalt for producing a road topping, whereby said bitumen or asphalt contains a proportion of paraffin obtained by Fischer-Tropsch synthesis (FT paraffin). This Patent document also relates to a road topping with said bitumen and to a method for producing a corresponding road topping or roadway/covering using said bitumen.

EP Pat. No. 582,219 narrates modified bitumens, process for their production, their use and solubility enhancers for plastified polyvinylbutyral in bitumen. The preparation of modified bitumens having improved elasticity properties and improved low-temperature flexibility by homogeneously mixing plasticised polyvinylbutyral (PVB) into molten bitumen has been discussed here.

Non-gellable, high temperature storage-stable bitumen/polymer compositions are provided in U.S. Pat. No. 5,756,565. The bitumen-polymer compositions, according to this document, may be used directly or in diluted form in a bitumen or bitumen mixture to form bitumen/polymer binders for producing road surfaces, coating materials or sealing materials.

EP Pat. No. 1,065,249 teaches about bitumen composition. Production of the bitumen preparation by homogenizing a mixture of bitumen and copolymer as above at 120-240° C., adding sulfur and mixing for at least 20 more minutes, is discussed here.

U.S. Pat. No. 6,087,420 provides a method for producing bitumen/polymer compositions which consists of contacting, between 100° C. and 250° C. and under agitation, a bitumen or a mixture of bitumens with at least one styrene and butadiene copolymer having a global butadiene content ranging between 50% and 95 wt. % and a content of butadiene 1,2 double-bond structural units ranging between 12% and 50 wt % of the copolymer, and, preferably, also a sulphuring coupling agent or a functionalizing agent. The bitumen/polymer compositions are usable, directly or after dilution, for forming bitumen/polymer binders for surfacing materials.

According to WO Pat. Application No. 1997014754 functionalised elastomer/bitumen compositions with a broad plasticity range are produced by contacting a bitumen or bitumen mixture with an elastomer, a functionalising agent and optionally a peroxide compound at 100-230° C. under stirring conditions. The functionalising agent is a thiolcarboxylic acid having 3 or more carbon atoms, a thiolcarboxylic acid ester and specifically a disulphide having carboxylic groupings or carboxylic esters. Said compositions may be used either directly or in diluted form to produce bituminous binders for making road surfacings, coated materials and sealing coatings.

U.S. Pat. No. 5,395,439 narrates a bituminous mixture, comprising from 0.5 to 20% by weight mineral wool in admixture with bitumen, the fibers of said mineral wool prior to any chemical or mechanical treatment, being equal to at most 7 per 5 grams, and said fibers being treated with a non-ionic finish.

U.S. Pat. No. 5,190,998 discusses bitumen blends. The said document discloses a paving composition comprising a blend of specified bitumen and high vinyl butadiene, substantially free of added sulphur or peroxide, with elastic recovery greater than 50%.

EP Pat. No. 1,352,031 teaches a bitumen composition, its manufacture and use.

WO Pat. Application No. 1993018092 elucidates a method for preparing bitumen-polymer compositions, application of said compositions to the production of coatings, and mother polymer solution for obtaining said compositions. In this Patent a bitumen is mixed, between 100° C. and 200° C. with a linear sequenced styrene/conjugated diene copolymer.

FR Pat. No. 2,517,686 relates to bitumen emulsion/asphalt mixtures containing a mixed binder which are prepared with the joint use of cation-active bitumen emulsion and hydraulic bindable powders. In addition to numerous advantages, the traditional bitumen emulsion/asphalt mixtures have the disadvantage that they can only be used for carriageway designs with lower stability requirements and of small size. According to the invention, bitumen emulsion/asphalt mixtures are prepared by the joint addition of hydraulic bindable powders and cation-active bitumen emulsion. According to the invention, asphalt mixtures which are of equal stability to traditional warm asphalt and have less deformation even at elevated temperature can be prepared in traditional asphalt and/or concrete mixing machines.

WO Application No. 2004096917 talks about packaging for bitumen. A consumable bitumen packaging compound including at least one packaging material/s, such as polymers, plastics and extenders and the like, used in combination with the bituminous material and a metal, either pure in powder form or in the form of salt or oxide, that is physically and/or chemically combined with the polymer material, so that the density of the packaging material is adjusted to prevent the material from floating to the surface of the molten material after melting. The components of the packaging are preferably selected such that they are compatible with the bitumen. After transport and storage, the packaging material can therefore be directly incorporated into the bitumen product for final use, such that the formation of a polymer skin accumulating at the surface of the molten material is largely avoided.

Procedure and machine for making cold bitumen-bound materials for road surfacing using initial phase with water added to mixed components is narrated in FR Pat. No. 2,813,619.

EP Pat. No. 1,350,813 describes a polymer-modified asphalt comprising from 0.5% to 10% of a comb copolymer comprising a backbone and at least one graft segment.

WO Application No. 2000077098 discusses polymer modified asphalt compounds and method for preparing it. U.S. Pat. No. 6,569,351 is directed to an accelerator-gel additive used to deliver an accelerator such as sulfur, into a system for the production of polymer modified asphalt, vulcanized rubber or similar system. Unlike conventional methods of delivering accelerator into the system, the accelerator-gel additive suspends the accelerator in a gel system thereby preventing the sedimentation of the accelerator during processing. As a result, the polymer and asphalt are processed at lower temperature reducing the production of toxic and flammable gases such as hydrogen sulfide.

EP Pat. No. 618,274 relates to polymer modified asphalt composition and method of preparation. The composition contains neutralized mixtures of oxidized asphalt and sulfonated polymer selected from sulfonated EPDM, sulfonated styrene-butadiene, and acrylic acid terpolymers, in an amount effective to allow the formation of one continuous phase or two interdispersed phases that do not segregate on standing at elevated temperatures.

In U.S. Pat. No. 4,333,866 a rubber-modified asphalt composition is prepared by reacting asphalt with a rubbery polymer, a polymerizable vinyl aromatic monomer and a polymerizable vinyl aromatic monomer in which the vinyl group is substituted whereby the chemical integration of the rubbery polymer with the asphalt is accelerated by the use of a combination of the polymerizable vinyl aromatic monomer and the substituted vinyl aromatic monomer.

U.S. Pat. No. 6,414,056 relates to polymer modified asphalt polyphosphoric and superphosphoric acid treated binder compositions having enhanced high service temperature performance properties and the method of making them and to road paving asphalts containing them.

WO Application No. 1997016491 deals with road paving binders. The said road paving asphaltic compositions have enhanced visco-elasticity and storage stability. The compositions, as disclosed in the said Patent, can be used as binders in road paving applications. Sulfonated copolymers of random styrene-isoprene may be substituted for the sulfonated copolymers of styrene-butadiene herein.

After going through a vast patent and non-patent literatures it is found that there is a need for a process for preparing bitumen bale which will include packing, storing and transporting of viscous bitumen. The said process, according to the present invention, is a clean, safe, environmentally friendly and cost effective method.

SUMMARY OF THE INVENTION

Accordingly, the present invention is directed to a process for preparing bitumen/asphalt bale for clean, safe, eco-friendly, energy saving cost-effective packing, storing and transporting of viscous bitumen products and the products thereof that substantially obviates one or more of the problems due to limitations and disadvantages of the related art.

It is, therefore, an object of the present invention to provide a process for preparing bitumen/asphalt bale for clean, safe, eco-friendly, energy saving cost-effective packing, storing and transporting of viscous bitumen products and the products thereof whereby the said bituminous products being introduced into a baling process line.

It is another object of the present invention to provide a process for preparing bitumen bale for clean, safe, eco-friendly, energy saving cost-effective packing, storing and transporting of viscous bitumen products which is a clean, safe, environmentally friendly and cost effective method.

It is a further object of the present invention to provide a process for preparing bitumen bale for clean, safe, eco-friendly, energy saving cost-effective packing, storing and transporting of viscous bitumen products in which the temperature of the bituminous product is controlled in preparation for dispensing in a very viscous state.

It is a further object of the present invention to provide a process for preparing bitumen bale for clean, safe, eco-friendly, energy saving cost-effective packing, storing and transporting of viscous bitumen products in which viscous bituminous product is dispensed from a storage tank at relatively low temperatures by means of a piston.

It is a further object of the present invention to provide a process for preparing bitumen bale for clean, safe, eco-friendly, energy saving cost-effective packing, storing and transporting of viscous bitumen products in which cooling efficiency is enhanced.

It is another further object of the present invention to provide a process for preparing bitumen bale for clean, safe, eco-friendly energy saving cost-effective packing, storing and transporting of viscous bitumen products for making "BituBale Film capsules"

It is another further object of the present invention to provide a process for preparing bitumen bale for clean, safe, eco-friendly energy saving cost-effective packing, storing and transporting of viscous bitumen products in which spiral formed bitumen bale is prepared.

It is another further object of the present invention to provide a process for preparing bitumen bale for clean, safe, eco-friendly energy saving cost-effective packing, storing and transporting of viscous bitumen products in which spiral baling of the PE encapsulated bituminous strips are formed in an energy efficient manner.

It is yet another further object of the present invention to provide a process for preparing bitumen bale for clean, safe, eco-friendly energy saving cost-effective packing, storing and transporting of viscous bitumen products in which polymer additives are added to bitumen/asphalt to enhance the durability and to give good gripping surfaces.

Still another further object of the present invention is to provide a process for preparing bitumen bale for clean, safe, eco-friendly energy saving cost-effective packing, storing and transporting of viscous bitumen products by which the process enhances the homogenous nature of the said products.

To achieve these and other advantages and in accordance with the purpose of the present invention, as embodied and broadly described, the process for preparing bitumen bale for clean, safe, eco-friendly energy saving cost-effective packing, storing and transporting of viscous bitumen products comprises the steps of: preparing and loading of the said bituminous products whereby the said bituminous products being introduced into a baling process line by way of an overhead pipeline through which heated bituminous product is pumped at a temperature in excess of 120° C., then cooled to the appropriate temperature for dispensing of the bituminous product in a cool very viscous state by means of a piston; Encapsulation and forming of the said bituminous product strips having further steps of:

(i) encapsulation of the said products in PE sleeves;
(ii) automatic loading of the said capsules;
(iii) forming of the bituminous product strips; and
(iv) cooling of the said strips;

rolling the said products into a bale by way of the baler wherein the lead end of the said bitumen strip being picked up by the roller press which guides the strip into the baler and the driving force generated by the said roller press pushes the strip into the curved smooth guides of the said baler that form the strip into a circular bale.

The process for preparing bitumen bale for clean, safe, eco-friendly and cost-effective packing, storing and transporting of viscous bitumen products wherein a pre-formed PE outer circumferential sleeve is slipped over the said bale that stops the said bale from unwinding its self when the said bale is formed.

The process for preparing bitumen/asphalt bale for clean, safe, eco-friendly, energy saving cost-effective packing, storing and transporting of viscous bitumen products wherein the leading end of the PE encapsulated and sealed bale strip leaving the cooling section is guided into the slot in the bale spindle.

Products utilizing the said process for preparing bitumen/asphalt bale, for clean, safe, eco-friendly, energy saving cost-effective packing, storing and transporting of viscous bitumen products, wherein the majority of the said bituminous products are used for paving roads.

Products utilizing the said process for preparing bitumen/asphalt bale, for clean, safe, eco-friendly and cost-effective packing, storing and transporting of viscous bitumen products, wherein the said bitumen products can be applied as tack/seal coats or utilized in hot mixing of gravels at the temperature of approximately 160° C.

Products utilizing the said process for preparing bitumen bale, for clean, safe, eco-friendly, energy saving cost-effective packing, storing, and transporting of viscous bitumen products, wherein during the melting process the said PE that has a melting point of 120° C. will integrate with the bituminous product.

Products utilizing the said process for preparing bitumen bale, for clean, safe, eco-friendly, energy saving cost-effective packing, storing, and transporting of viscous bitumen products wherein the said bitumen/asphalt bale as supplied with PE wrapping is heated to the required application temperature, approximately 160° C.

Products utilizing the said process for preparing bitumen/asphalt bale, for clean, safe, eco-friendly, energy saving cost-effective packing, storing and transporting of viscous bitumen products, wherein rubber and/or other polymers are added to the said bitumen/asphalt to enhance the durability and to give good gripping surfaces.

Products utilizing the said process for preparing bitumen/asphalt bale, for clean, safe, eco-friendly, energy saving cost-effective packing, storing and transporting of viscous bitumen products, wherein rubber and/or other polymers are added to the said bitumen/asphalt in the ratio of approximately twenty parts of the said bitumen/asphalt to one part of the said rubber/polymer.

Products utilizing the said process for preparing bitumen/asphalt bale, for clean, safe, eco-friendly, energy saving cost-effective packing, storing and transporting of viscous bitumen products, wherein the said spiral form of the bale insures distribution of the said PE through out the said bituminous products and during melting a mild vortex is produced which further enhances the homogenous nature of the said products.

Products utilizing the said process for preparing bitumen/asphalt bale, for clean, safe, eco-friendly, energy saving cost-effective packing, storing and transporting of viscous bitumen products, wherein the said PE enhances the said bitumen giving extra durability and resistance to rutting when used as paving for roads.

Additional features and advantages of the invention will be set forth in the description which follows, and in part will be apparent form the description, or may be learned by practice of the present invention. The objectives and other advantages of the invention will be realized and attained by the structure particularly pointed out in description and claims hereof as well as appended drawings.

BRIEF DESCRIPTION OF THE DRAWINGS

The invention is described in the following in greater detail by way of an example with reference to the accompanying drawings in which.

DESCRIPTION OF THE PREFERRED EMBODIMENT

Figure 1:
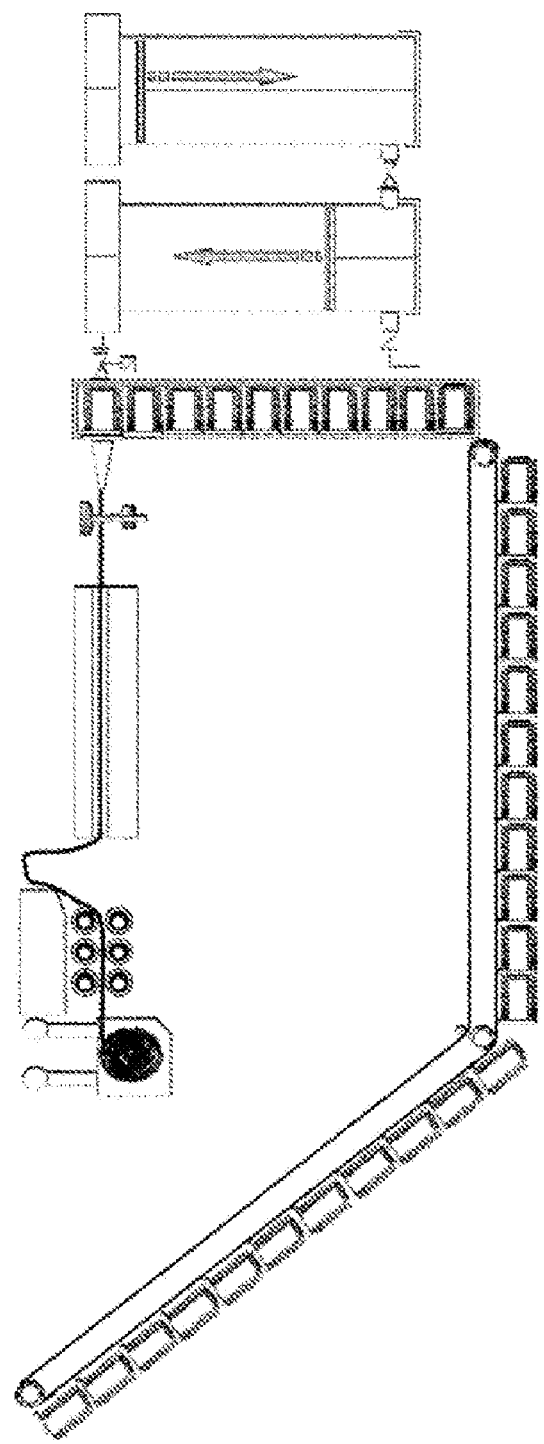
FIG. 1 illustrates a flow diagram of bitumen bale processing line, according to the present invention; [BBP 0.002]
Figure 2:
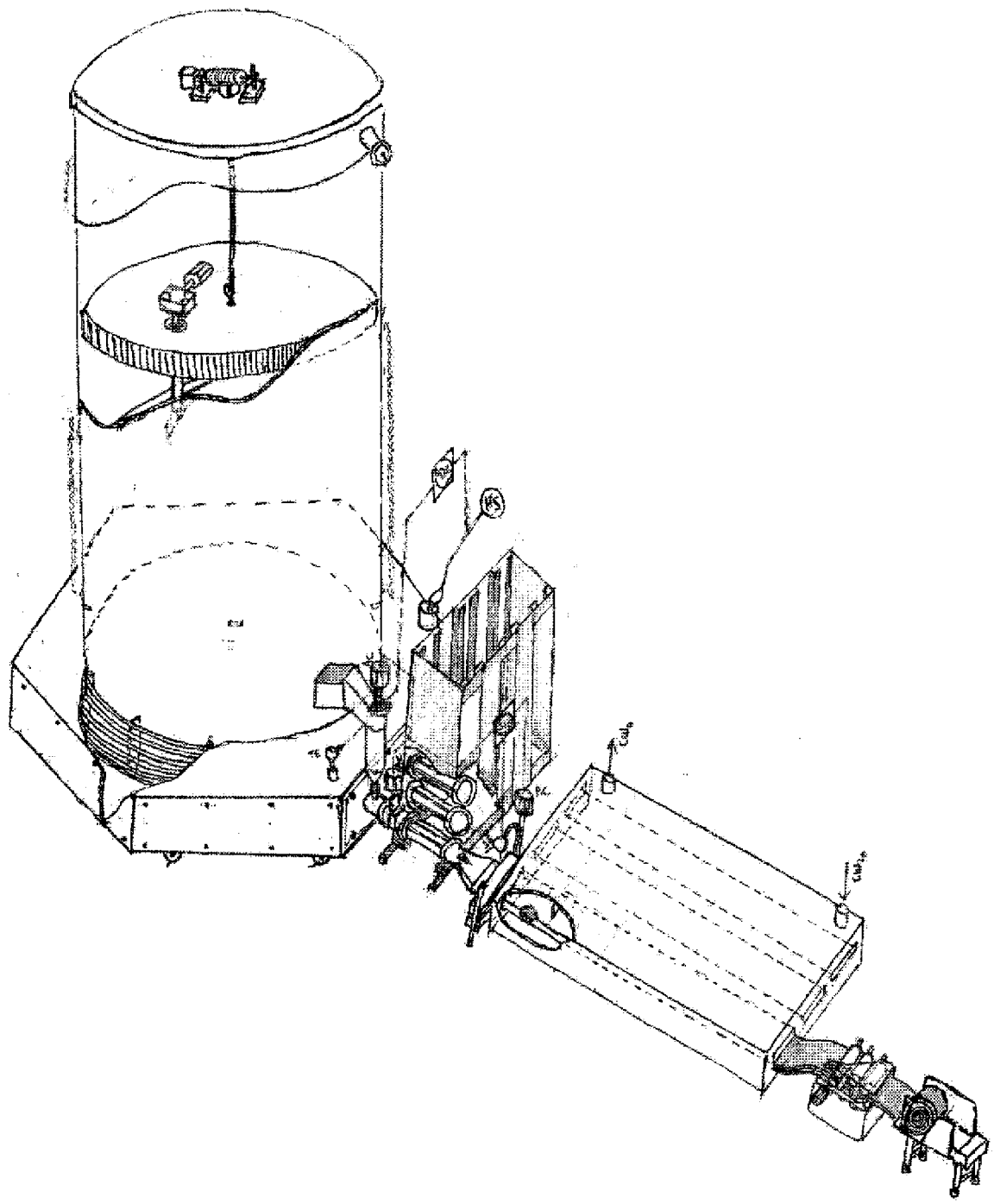
FIG. 2 illustrates a bitumen bale processing line, according to the present invention; [BBP 0.001]
Figure 3:
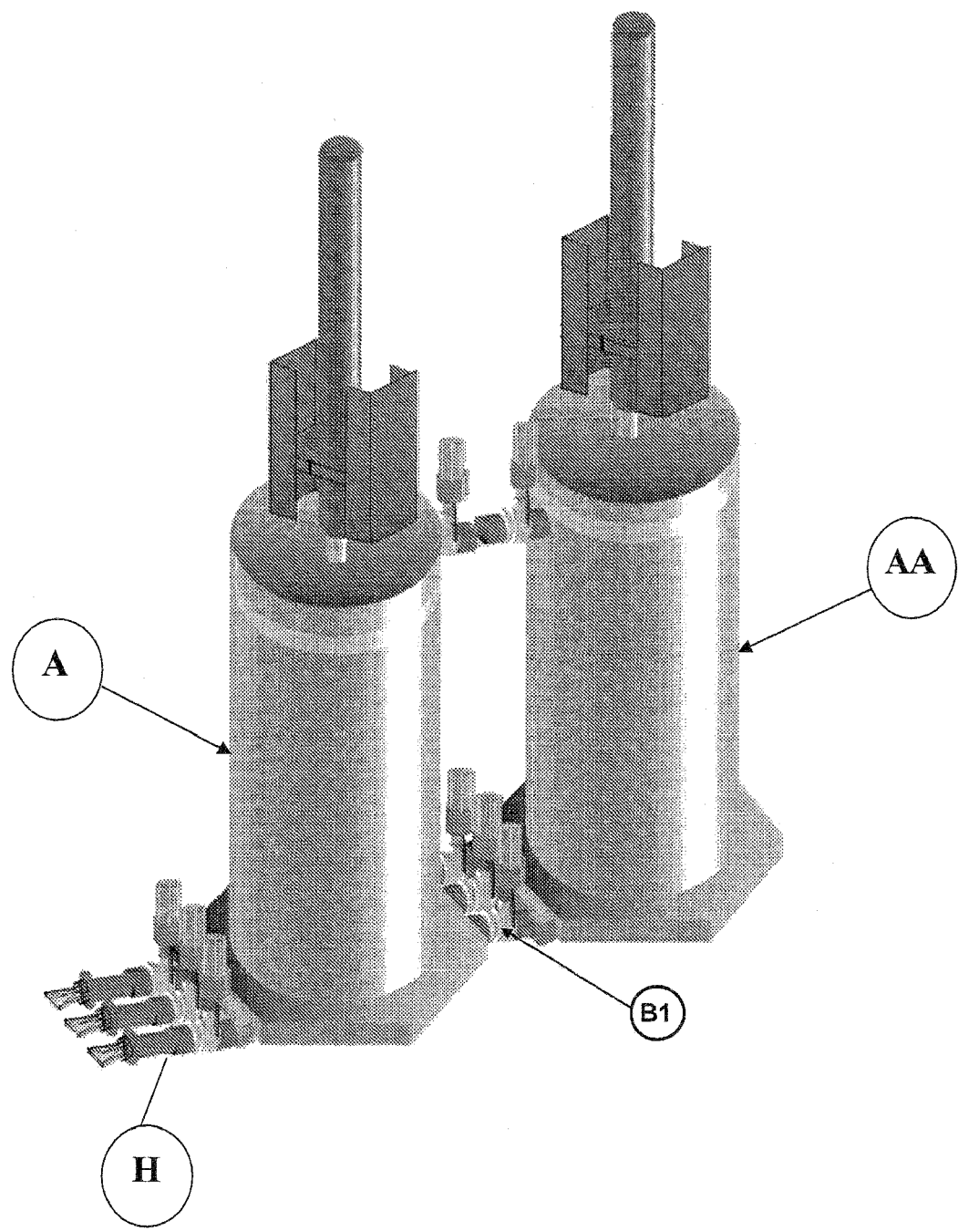
FIG. 3 shows a schematic diagram illustrating the product storage, temperature control and dispensing of the said bituminous products, according to the present invention; [BBP 0.003]
Figure 4:
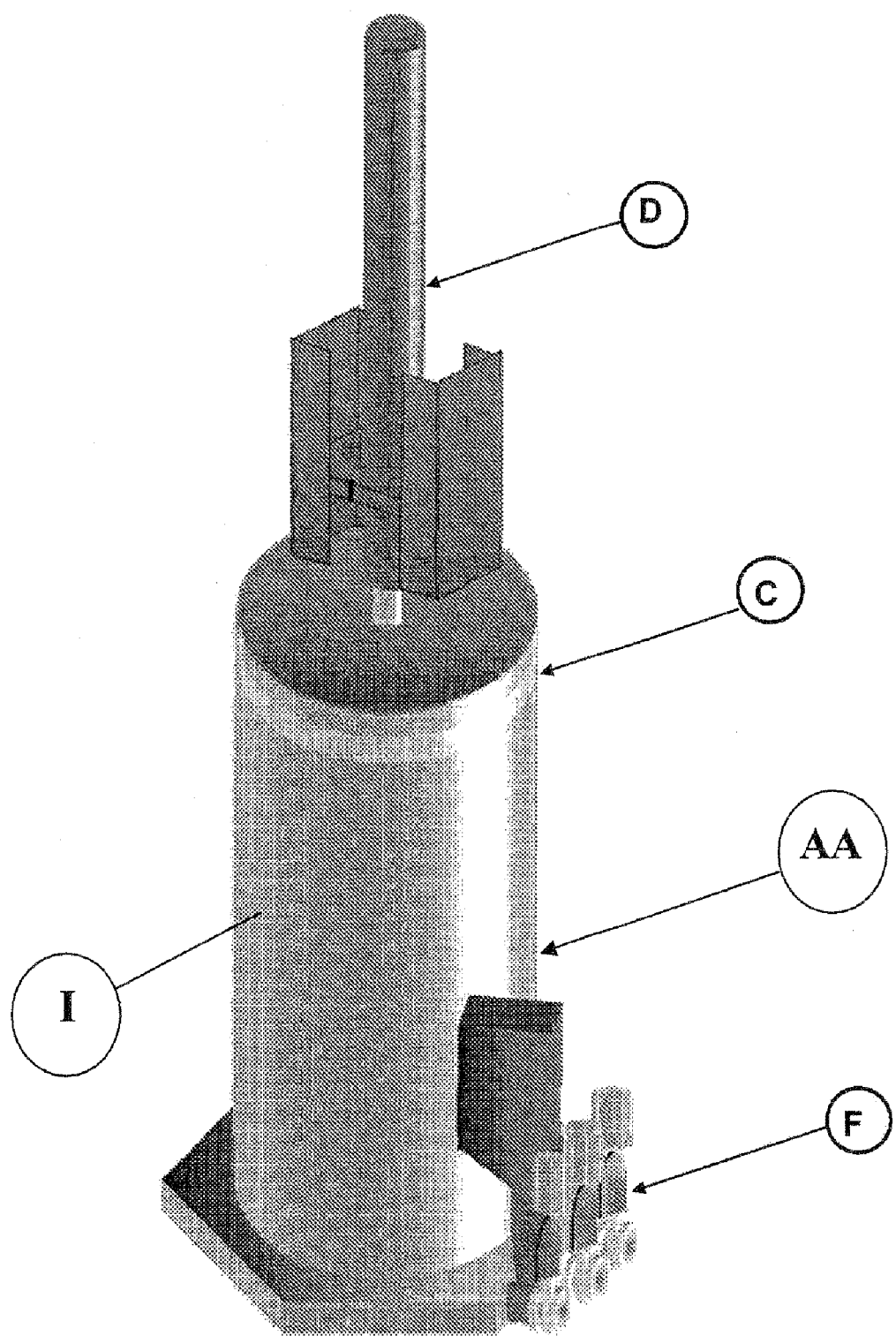
FIG. 4 illustrates the rubberized bitumen/polymer modified asphalt (PMA) additives; [BBP 0.006]
Figure 5:
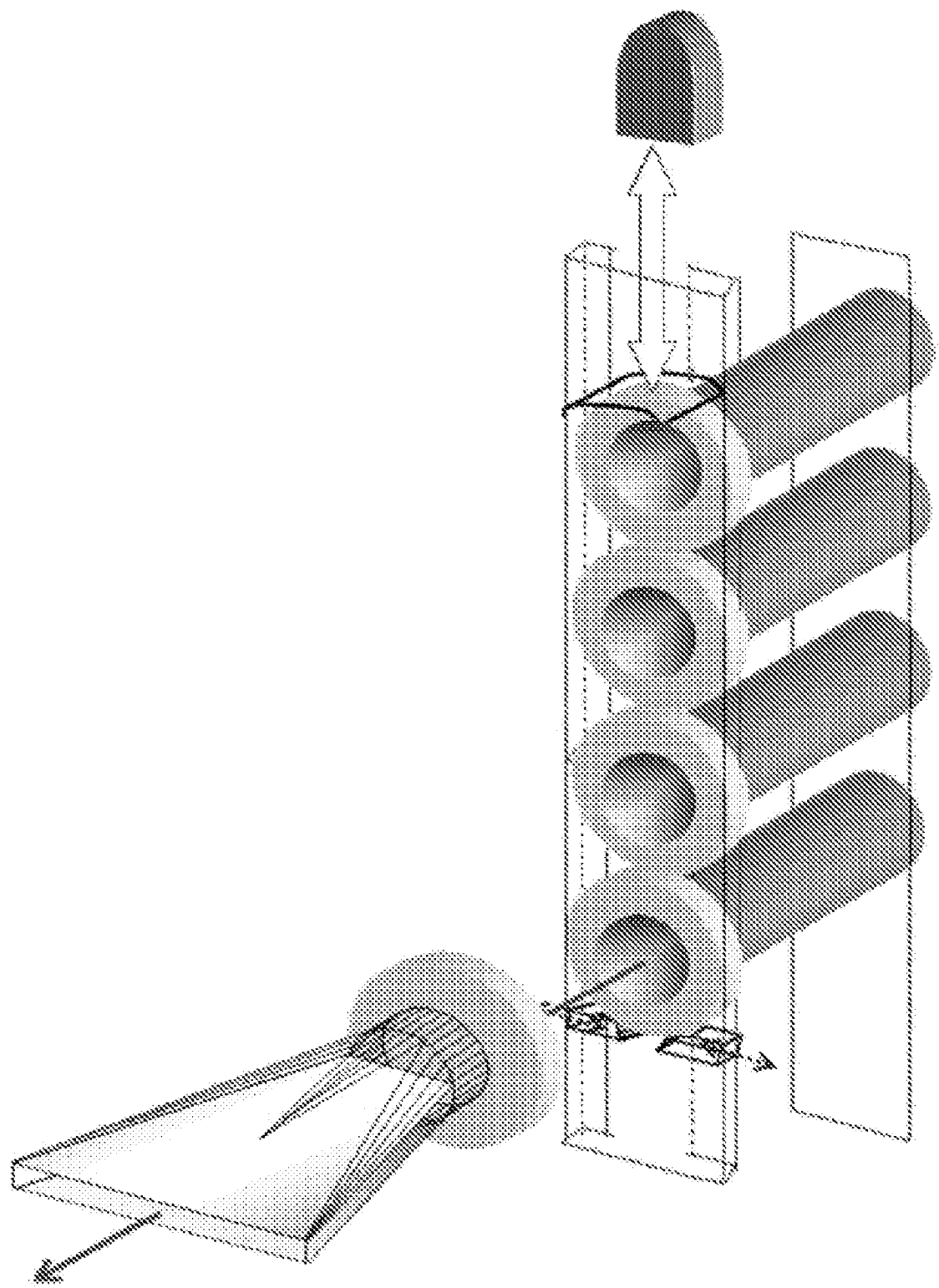
FIG. 5 depicts a capsule dispenser and former, according to the present invention; and [BBP 0.004]
Figure 6:
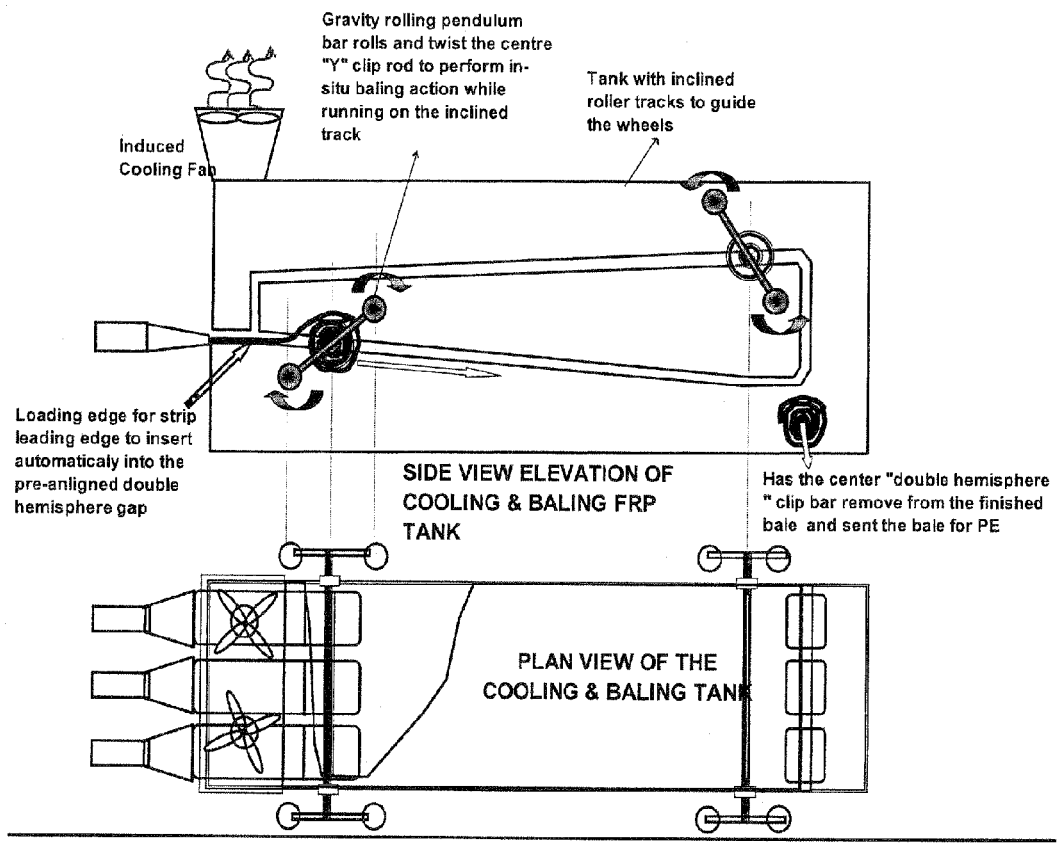
FIG. 6 elucidates the bale strip cooling and baling process, according to the present invention. [BBP 0.005]

The process for preparing bitumen bale for clean, safe, eco-friendly, energy saving cost-effective packing, storing and transporting of viscous bitumen products involves the following steps:

(i) product storage, heat control & dispensing;
(ii) encapsulation and forming of the bituminous product strips;
(iii) cooling of the said strips, and
(iv) baling process.

In the first step, preparing and loading of the said bituminous products are done. The said bituminous products are introduced into a baling process line by way of an overhead pipeline through which heated bituminous product is pumped at a temperature in excess of 120° C.

The product is first stored in storage/cooling tank (AA). The said tank is filled via nozzle/gate valve (B1) after the piston (C) has been raised to the top of the said tank (AA) by means of a hydraulic ram, winch or any other suitable driving means (D).

After the said storage tank (AA) is filled the product is cooled by skin effect air blowing. The heat transfer is enhanced by fitting a wire mesh (I) around the circumference of the said tank (AA). The cooling efficiency is also enhanced by agitation of the tank contents by way of a mixer plunger mounted on the plunger piston (C).

After cooling to the desired temperature the product is transferred from said storage tank (AA) which is connected to the said tank (A) by way of inter tank nozzles/gate valves (B1). The temperature of the product at this stage has to be sufficiently high so as to allow transfer from the storage tank (AA) by way of compression created by the downward stroke of the piston (C) installed in the said tank (AA). The piston is lowered by the said hydraulic ram, winch or any other suitable driving means (D).

The heat at which the product is dispensed for encapsulation is important. A safety feature is included in the said process whereby the said dispensing control valves (F) will not open if the temperature of the product is in excess of the desired temperature. A signal is generated from the heat sensors (E) if the temperature is too high which closes the dispensing valves (F) thereby protecting the PE (polyethylene) encapsulation process.

When the bitumen is of the correct temperature the dispenser control valves (F) are opened the product is then forced out of the storage/dispensing tank by the piston (C) installed in the tank. Should the temperature fall below the desired temperature rang a heating coil mounted in the bottom of the said tank will be switched on automatically by a signal transmitted by the heat sensor via a controller.

Once the contents of the tank are dispensed the piston is raised by means of the hydraulic ram, winch or any other suitable on top of the tank (D) and the process as described above is repeated.

The number of dispenser nozzle sets (H) at the foot of the tank can be varied dependant of output capacity required. The dimensions of the storage tank may vary dependant on planned production volumes required.

Encapsulation and forming of the said bituminous product strips further has steps of:
(i) encapsulation of the said products in PE sleeves;
(ii) automatic loading of the said capsules;
(iii) forming of the bituminous product strips; and
(iv) cooling of the said strips.

Once the product passes through the said dispensing control valves (F) it is encapsulated in a PE/Polymer film tube that is pre-installed on the "BituBale Film capsule". The required length of PE/Polymer film tube is pre-installed in the "BituBale Film capsule" and heat-sealed at the leading edge end. When the bituminous product is dispensed from the tank when valves (F) are opened the product under compression pushes through the internal core of the "BituBale Capsule" pulling the PE off the external surface of the said capsule and through the internal core of the capsule. After the complete length of PE is pulled through the said capsule the trailing edge of the PE tube which now encapsulates the product is sealed by heat-sealing machine. The heat-sealing machine is activated by a bar code attached close to the end of the tailing end of the pre installed PE/Polymer film tube. This bar code also activates the closing of the dispensing valves (F). The bar code is read by sensor that sends an electrical impulse to controller closing the valves and sealing the round tube that completes the encapsulation stage.

The "BituBale Film capsules" are pre-loaded into the said capsule dispenser (L) that automatically places the capsule in position and applies pressure to sandwich the capsule between the dispensing valves (F) and forming nozzle. The empty capsule is displaced and replaced automatically once a product strip has been fully encapsulated. A pre mark bar code on the last section of the PE sleeve preinstalled in the "BituBale Film capsule" activates the motorized support is rotated or pulled downward which allows the empty capsule to fall away and the next capsule in the dispenser will move down to take its place.

The product when exiting the encapsulation process is in a PE round tube which must then be converted into a flat strip suitable for baling. This is achieved by forcing the PE encapsulated bituminous tube through the forming nozzles. The required force is applied by the said piston (C) and product head compressing the product in the said tank (A).

In some less viscous products it is desirable to lower the temperature of the strips before baling which is carried out via the bale strip-cooling chamber (P). This chamber is a water cooler whereby the bale strips pass through constantly circulating cooling water.

After leaving the forming process section the sealed strips are rolled into a bale by way of the baler wherein the lead end of the said bitumen strip being picked up by the roller press. The said the roller press guides the strip into the baler. The driving force generated by the said roller press pushes the strip into the curved smooth guides of the said baler that form the strip into a circular bale.

To ensure complete integrity of the said bale a further PE wrapping is applied around the said bale to ensure no accidental leakage of product is possible.

The majority of bituminous products are used for paving roads. To enable the bitumen to be applied as tack/seal coats or utilized in hot mixing of gravels the temperature has to be raised to approximately 160° C.

The said bitumen bale as supplied with PE wrapping is heated to the required application temperature, approximately 160° C. During the melting process the PE that has a melting point of 120° C. will integrate with the said bituminous product. The PE enhances the said bitumen giving extra durability and resistance to rutting when used as paving for roads.

The spiral form of the bale insures distribution of the PE throughout the said bituminous product and during melting a mild vortex is produced that further enhances the homogenous nature of the product.

Rubber and/or other polymers are added to bitumen/asphalt to enhance the durability and to give good gripping surfaces. Normally this is in the ratio of approximately 20:1.

The bitumen bale process introduces the rubber/polymers at the tank dispenser nozzles via a non-return valve. The additive is contained in an overhead silo and injected into the bitumen/asphalt stream by way of a screw conveyor feed. The entire bitumen bale process is summarized below.

Product Storage, Heat Control & Dispensing.

The Bituminous product is introduced into the system by way of an overhead pipeline through which heated bituminous product is pumped at a temperature in excess of 120° C.

The product is first stored in storage/cooling tank (AA). The Tank is filled via nozzle/gate valve (B1) after the piston (C) has been raised to the top of tank (AA) by means of hydraulic ram, winch or any other suitable driving means (D).

The product is cooled by skin effect air blowing as soon as the said storage tank (AA) is filled. The heat transfer is enhanced by fitting a wire mesh (I) around the circumference of the tank (AA). The cooling efficiency is also enhanced by agitation of the tank contents by way of a mixer/plunger agitator mounted on the plunger piston (C).

After cooling to the desired temperature the product is transferred from storage tank (AA) which is connected to tank (A) by way of inter tank nozzles/gate valves (B1). The temperature of the product at this stage has to be sufficiently high so as to allow transfer from the storage tank (AA) by way of compression created by the downward stroke of the piston (C) installed in tank (AA). The piston is lowered by the hydraulic ram, winch or any other suitable driving means (D).

Dispensing the Product:

The heat at which the product is dispensed for encapsulation is important. A safety feature has been introduced whereby the dispensing control valves (F) will not open if the temperature of the product is in excess of the desired temperature. A signal is generated from the heat sensors if the temperature is too high which closes the dispensing valves (F) thereby protecting the PE encapsulation process.

When the bitumen is of the correct temperature the dispenser control valves (F) are opened the product is then forced out of the storage/dispensing tank by the weight of the piston (C) installed in the tank. Should the temperature fall below the desired temperature rang a heating coil mounted in the bottom of the tank will be switch on automatically by a signal transmitted by the heat sensor via a controller.

Once the contents of the tank are dispensed the piston is raised by means of the hydraulic ram, winch or any other suitable driving means mounted on top of the tank and the process as described above is repeated.

The number of dispenser nozzle sets (H) at the foot of the tank can be varied dependant of output capacity required. The dimensions of the storage tank will vary dependant on planned production volumes required.

Step 2: Encapsulation and Forming of the Bituminous Product Strips:

Encapsulation of Product in PE Sleeves:

Once the product passes through the dispensing control valves (F) it is encapsulated in a PE/Polymer film tube which is pre-installed on the "BituBale Film capsule". The required length of PE/Polymer film tube is pre installed in the "BituBale Film capsule" and heat sealed at the leading edge end. When the bituminous product is dispensed from the tank when valves (F) are opened the product under compression pushes through the internal core of the "BituBale Capsule" pulling the PE off the external surface of the capsule and through the internal core of the capsule. After the complete length of PE is pulled through the capsule the trailing edge of the PE tube which now encapsulates the product is sealed by heat-sealing machine. The heat-sealing machine is activated by a bar code attached close to the end of the tailing end of the pre installed PE/Polymer film tube. This bar code also activates the closing of the dispensing valves (F). The bar code is read by sensor which sends an electrical impulse to controller closing the valves and sealing the round tube which completes the encapsulation stage.

Automatic Loading of Capsules:

The "BituBale Film capsules" are pre-loaded into the capsule dispenser that automatically places the capsule in position and applies pressure to sandwich the capsule between the dispensing valves (F) and forming nozzle. The empty capsule is displaced and replaced automatically once a product strip has been fully encapsulated. A pre mark bar code on the last section of the PE sleeve preinstalled in the "BituBale Film capsule" activates the capsule dispenser. A pneumatic or motorized support is rotated or pulled downward which allows the empty capsule to fall away and the next capsule in the dispenser will move down to take its place.

Forming of the Bituminous Product Strips (with Cooling Option):

The product when exiting the encapsulation process is in a PE round tube which must then be converted into a flat strip suitable for baling. This is achieved by forcing the PE encapsulated bituminous tube through the forming nozzles. The required force is applied by the piston (C) and product head compressing the product in tank (A).

Cooling of the Strips:

In some less viscous products it is desirable to lower the temperature of the strips before baling which is carried out via the bale strip-cooling chamber. This chamber is a water cooler whereby the bale strips pass through constantly circulating cooling water.

Step 3: Rolling the Strips into Bale Form:

After leaving the forming process section the sealed strips are rolled into a bale by way of the baler. The lead end of the bitumen strip is picked up by the roller press which guides the strip into the baler. The driving force generated by the roller press pushes the strip into the curved smooth guides of the baler that form the strip into a circular bale. When the bale is formed and end of the tail strip enters the baler a pre-formed PE outer circumferential sleeve is slipped over the bale that stops the bale from unwinding its self.

Step 4: Outer Wrap Protection:

To ensure complete integrity of the bale a further PE wrapping is applied around the bale to ensure no accidental leakage of product is possible.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A process for preparing bitumen/asphalt bale comprising the steps of:
   (a) preparing and loading of the said bituminous products;
   (b) product storage, heat control and dispensing;
   (c) encapsulation and forming of the bituminous product strips; and
   (d) rolling the said strips into bale form;
   whereby the said bituminous products being introduced into a baling process line by way of an overhead pipeline through which heated bituminous product is pumped at a temperature in excess of 120° C., then cooled to the appropriate temperature for dispensing of the bituminous product in a cool very viscous state by means of a piston;
   the product being stored in storage/cooling tank (AA), the said tank being filled via nozzle/gate valve (B1) after the piston (C) being raised to the top of tank (AA) by means of a hydraulic ram, winch or any other suitable driving means (D);

the product being cooled by skin effect air blowing as soon as the said storage tank (AA) is filled, the said heat transfer being enhanced by fitting a wire mesh (I) around the circumference of the said tank (AA) and the cooling efficiency being enhanced by agitation of the said tank contents by way of a mixer plunger mounted on the plunger piston (C);

after cooling to the desired temperature the product being transferred from the said storage tank (AA) connected to a tank (A) by way of the said inter tank nozzles/gate valves (B1) wherein the temperature of the product at this stage being sufficiently high so as to allow transfer from the storage tank (AA) by way of compression created by the downward stroke of the piston (C) installed in tank (AA), the said piston (C) being lowered by the said hydraulic ram, winch or any other suitable driving means (D);

encapsulation and forming of the said bituminous product strips having further steps of (i) encapsulation of the said products in polyethylene (PE) sleeves, (ii) automatic loading of the said capsules, (iii) forming of the bituminous product strips and (iv) cooling of the said strips; and rolling the said products into a bale being performed by way of a baler wherein a lead end of the said bitumen strip being picked up by a roller press which guides the strip into the baler and driving force generated by the said roller press pushes the strip into curved smooth guides of the said baler that form the strip into a circular bale, the said products being rolled into spiral forms for ease of stacking and storage in warehouse.

2. The process for preparing bitumen/asphalt bale, according to claim 1, wherein a pre-formed PE (polyethylene) outer circumferential sleeve is slipped over the said bale that stops the said bale from unwinding its self when the said bale is formed.

3. The process for preparing bitumen/asphalt bale, according to claim 1, wherein the leading end of the PE encapsulated and sealed bale strip leaving the cooling section is guided into the slot in the bale spindle.

* * * * *